March 15, 1966 G. V. MOMMSEN 3,240,533
COATING APPARATUS HAVING SLIDABLE FLOW CONTROL MEMBER
Filed Sept. 9, 1963 2 Sheets-Sheet 1
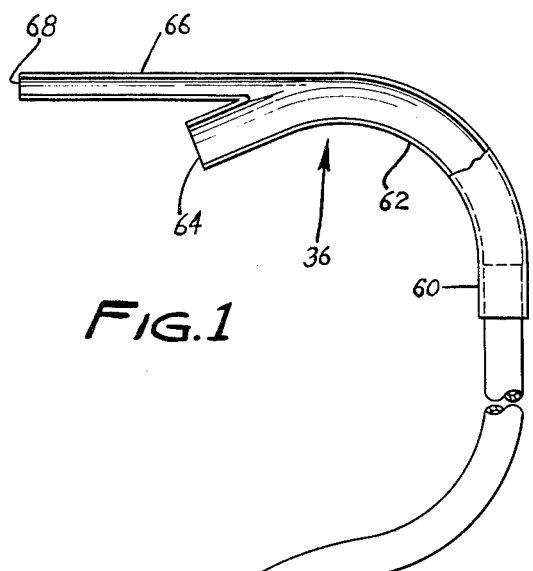
FIG.1
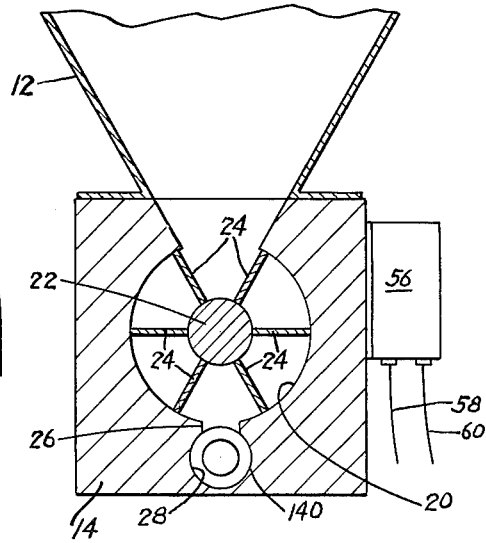
FIG.2
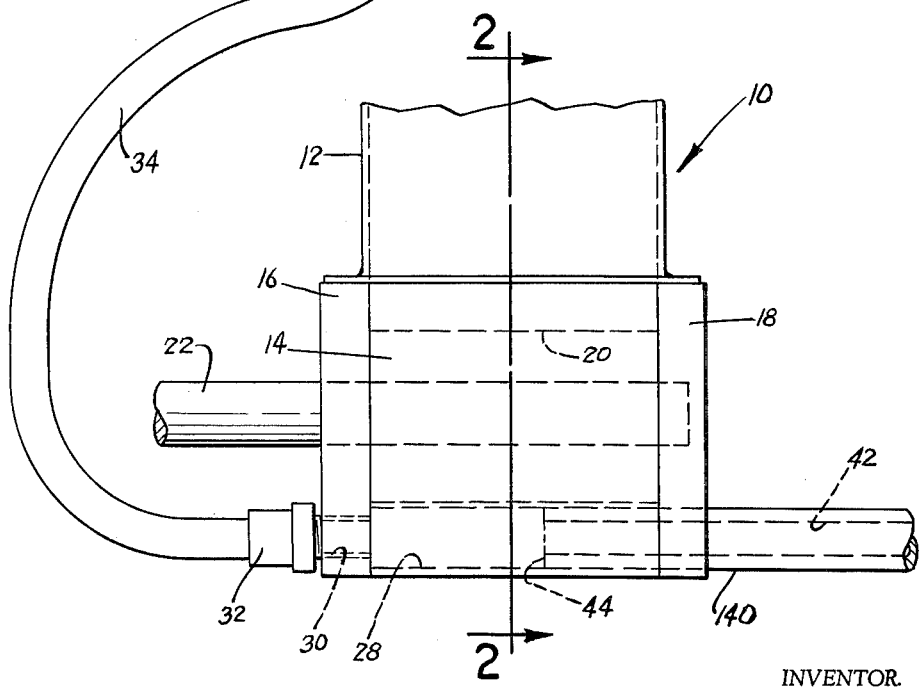
INVENTOR.
GORDON V. MOMMSEN
BY Moore, White & Burd
ATTORNEYS

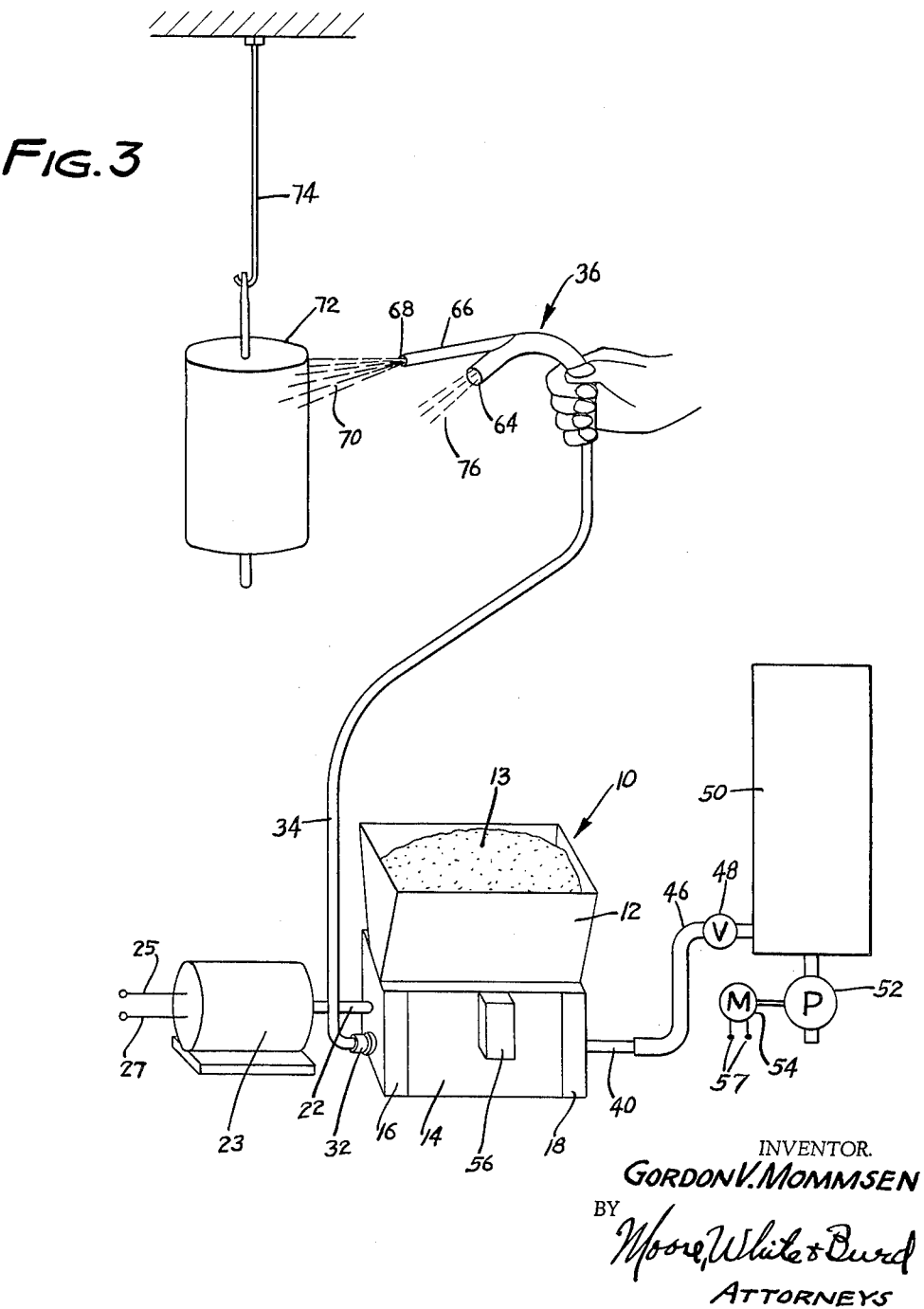

United States Patent Office 3,240,533
Patented Mar. 15, 1966

3,240,533
COATING APPARATUS HAVING SLIDABLE
FLOW CONTROL MEMBER
Gordon V. Mommsen, Minneapolis, Minn., assignor to Possis Machine Corporation, Minneapolis, Minn., a corporation of Minnesota
Filed Sept. 9, 1963, Ser. No. 307,638
2 Claims. (Cl. 302—49)

The present invention relates to the coating art and more particularly to an improved apparatus for feeding finely divided particulate material at a controlled rate to a workpiece in the formation of a coating thereon.

A number of devices have been previously proposed for depositing particulate material on a workpiece which is to be coated. These prior devices have not however been entirely satisfactory, some having been relatively expensive to manufacture and complicated in operation while others are to some extent ineffective in reliably transferring the particulate material at a controlled rate to the surface of the object which is to be coated.

While the apparatus according to the present invention has general application, it is particularly useful in coating objects with a thin layer of an epoxy resin. To this end, the epoxy resin is supplied in the form of a fine powder and is forced to travel as a stream onto the object which is to be coated, the object itself being heated beforehand to a temperature which is sufficient to cause the resin to adhere to the surface thereof and subsequently to form a tough impervious coating thereon.

In order to produce coatings of the type described with uniformity, it is imperative that the coating material be applied at a predetermined and uniform rate. Moreover, to adequately control the thickness of the coating, it is important to be able to regulate the rate of flow of resin through the nozzle of the coating instrument. A third important requirement is that the coating material be applied as a uniform stream substantially free from entrained air because it has been found that a large amount of entrained air tends to cool the surface of the object being coated. Furthermore, the surface air currents tend to prevent particles from adhering to the surface after being deposited.

In accordance with the present invention a metering means is provided for feeding the particulate material to a nozzle means at a controlled and predetermined rate. A further means is provided for removing entrained air from the particulate material passing toward the nozzle.

It is one object of the present invention to provide an improved coating apparatus including a simply constructed and reliable means for maintaining constant the flow of particulate material which is to be coated.

Another object of the present invention is the provision of an improved coating apparatus for depositing finely divided particulate material having a means for removing air from the particulate material.

Yet another object of the present invention is the provision of an improved coating apparatus including a provision for mixing a finely divided particulate material with a stream of air to carry the particulate material into a nozzle and a centrifugal means for separating the particulate material from the air stream.

A still further object of the present invention is the provision of a coating apparatus including a metering means for delivering particulate material into an air stream at a controlled rate and a sealing means to prevent air from being blown from the air stream back into the stored particulate material.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

FIGURE 1 is a side elevational view partly in section of a coating apparatus embodying the present invention;
FIGURE 2 is a vertical sectional view taken on line 2—2 of FIGURE 1; and
FIGURE 3 is a perspective view of the invention as it appears during operation.

Referring now to the drawings there is shown a coater 10 embodying the present invention. The coater 10 includes a container means such as a hopper 12 for holding a supply of finely divided particulate material which is to be coated. Ordinarily, the particulate material will comprise a finely divided epoxy resin of a suitable commercially available type.

Beneath the hopper 12 is provided a metering means including a housing 14 which is sealed at each end by end plates 16 and 18. The housing 14 has a horizontally disposed bore 20 extending therethrough within which is positioned a horizontally disposed operating member such as a shaft 22 to which is affixed a plurality of radially extending and circumferentially spaced blades 24 adjusted to fit in the bore 20 with sufficient clearance so that the shaft 22 can be easily turned but close enough to the wall of bore 20 to prevent any substantial flow of air from the bottom to the top of bore 20. The shaft 22 and blades 24 thus serve as a sealing means as well as a metering means.

Beneath the bore 20 is provided a downwardly extending slot 26 which communicates at it lower end with a second horizontally disposed bore 28 communicating through a bore 30, hose fitting 32 and a flexible hose 34 with a nozzle indicated generally at 36. The nozzle 36 is used to direct particulate material onto the object which is to be coated as well be described more fully hereinbelow.

As clearly shown in FIGURE 1, a combined metering control and air supply means such as a pipe 40 is slidably mounted within the bore 28. The pipe 40 includes a bore 42 therein. The inward end 44 of pipe 40 coacts with the walls of the bore 28 to define a chamber 29 into which the stored particulate material 13 will fall when the shaft 22 is turned. The chamber 29 can be varied in size by sliding the tube 40 within the bore 28. Thus, to increase the size of the chamber 29, the tube 40 is slid outwardly or toward the right in FIGURE 1 and to decrease the size of the chamber 29, the tub 40 is slid toward the left in FIGURE 1. Since the upward surface of that portion of the tube 40 within the bore 28 will seal the slot 26, the amount of material flowing downwardly from the metering means into the chamber 29 will, of course, be decreased depending upon the amount of the slot 26 which is obstructed. When less of the slot 26 is covered, more material will flow into the chamber 29 with the shaft 22 turning at a uniform rate.

As shown in FIGURE 3 the pipe 40 communicates as through a hose 46 with a shutoff valve 48 which is connected to a source of air under pressure such as an air supply tank 50, the latter being pressurized in any suitable manner as by means of a pump 52. The pump 52 is driven by a suitable motor 54 to which current is supplied through conductors 57.

As best seen in FIGURES 2 and 3, a vibrating means such as an electrical vibrator 56 of any suitable known construction is operatively connected to container 14 for imparting vibration thereto so as to prevent bridging of the material 13 as it passes downwardly into the metering means. Current is supplied to the vibrator 56 through conductors 58 and 60 (FIGURE 2).

The nozzle 36 is now to be described in detail. As best seen in FIGURE 1, the nozzle 36 includes a tube 59 having a vertically disposed inlet portion 60 which communicates with an arcuate portion 62 that terminates in a somewhat downwardly inclined outlet portion 64 having an air discharge opening 65 therein. Communicating with the arcuate portion 62 somewhat upstream of the outlet portion 64 and at approximately the uppermost point thereon is an efflux tube 66. Tube 66 extends laterally somewhat beyond the air discharge opening 65 and terminates in a nozzle opening 68. The outward edge of the tube 66 is continuous with the outer wall of the arcuate portion 62 of the tube 59. It should also be noted that the center line of the tube 66 is substantially tangent to the arcuate portion 62.

In operation, material traveling upwardly through the tube 34 will contain a substantial quantity of air entrained therein. The particulate material will be thrown against the outward wall of the arcuate portion 62 of the nozzle and will be maintained in contact therewith through the action of centrifugal force. The air passing through the tube 34 will, on the other hand, follow the center of tube 59 and will be exhausted through the portion air discharge opening 65. The particulate material exhausted through the nozzle 68 will thus form a stream 70 (FIGURE 3) which can be directed on an object 72 which is to be coated. The object to be coated 72 can itself be supported in any suitable manner as by means of a support rod 74 while the coating operation is being performed.

Passing out through the opening 65 is a stream 76 composed for the most part of air but which will often include relatively small and negligible amount of the solid particulate material 13.

When the apparatus according to the present invention is to be placed in use, the flow control means comprising the tube 40 is slid axially within the bore 28 to the desired position to allow the desired flow through tube 34 with the motor 23 running at a constant rate. The motor 23 and vibrator 56 are then placed in operation as is the motor 54 and pump 52. With the hopper 12 filled with coating material 13, the valve 48 is opened allowing compressed air to pass through the duct 46 and tube 40 into the chamber 29. As the motor 23 and the shaft 22 turn, the blades 24 of the metering means will of course transfer the material 13 from the hopper 12 downwardly to the slot 26. The particulate material 13 will pass into the chamber 29 at a rate dependent upon the amount of slot 26 which has been closed by the flow control pipe 40, and will be forced to travel to the nozzle 36 with the compressed air which enters through the tube 40. With the shaft 22 running at a constant rate, the withdrawing of the tube 40 from the bore 28 will of course increase the flow rate of the particulate material into the nozzle 36. Correspondingly, an insertion of the tube 40 further into the bore 28 will reduce the amount of material flowing to the nozzle 36.

As explained hereinabove, the material passing upwardly through the hose 34 and into the nozzle 36 will be divided into two separate streams, the first comprising the solid particulate material which through the action of centrifugal force will be forced against the outward curvature of the arcuate portion 62 of the nozzle and will flow through the efflux tube 66. The second stream of material passing into the nozzle comprises air which will for the most part be exhausted through the opening 65. In this manner the air is effectively removed from the particulate material 13 before being exhausted from the nozzle 36. As a result, the surface of the article 72 will not be cooled significantly by the relatively small amount of air entrained in the material 13. Moreover, the material which has already adhered to the surface of the article 72 will have little tendency to be removed by the air used in transporting the coating material to the nozzle 36.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A coating apparatus for depositing relatively small particles of solid particulate material on an object comprising in combination a storage container for holding a supply of particulate material, a metering means, said metering means including a housing having a cylindrical chamber and a rotor mounted therein for rotation, a drive means operatively connected to said rotor, said rotor including a plurality of circumferentially spaced and radially extending blades, the outward ends of said blades being positioned in sealing relationship with the wall of said cylindrical chamber, a second chamber communicating with the lower end of said metering means, a duct means communicating with said second chamber for supplying air under pressure thereto, a discharge nozzle communicating with said second chamber, said blades being adapted to prevent the flow of air from said second chamber into said storage container, and a flow control member comprising a cylindrical air supply pipe slidably mounted within said second chamber for regulating the size of opening between it and said metering means to thereby control the flow of said particulate material therethrough.

2. A coating apparatus for depositing particulate material on a workpiece comprising in combination, a container means for storing a supply of said particulate material, a nozzle, a metering means communicating with said container for controlling the flow of said particulate material from said container, a source of air under pressure, duct means interconnecting said metering means and said source of air under pressure, a tube interconnecting said metering means and said nozzle, and a sealing means between said duct and said container for preventing flow of air from said duct means to said container, said metering means having an opening communicating with said duct means and tube; said duct means including a cylindrical air supply pipe slidably secured to said metering means to slide across and cover at least in part and variously the opening of said metering means for regulating the affective size of opening from said metering means communicating with said duct means and tube to thereby control the flow of said particulate material from said metering means into said tube.

References Cited by the Examiner

UNITED STATES PATENTS

| 1,020,743 | 3/1912 | Burlingham et al. | 302—49 |
|---|---|---|---|
| 1,102,354 | 7/1914 | Pougnet | 239—550 |
| 1,582,446 | 4/1926 | Bowman | 302—49 |
| 1,780,168 | 11/1930 | Burmeister | 239—553 |
| 1,844,172 | 2/1932 | Moore | 302—49 |
| 1,863,924 | 6/1932 | Dunn | 239—336 |
| 1,885,645 | 11/1932 | Vawter | 239—553 |
| 1,918,799 | 7/1933 | Conley | 239—336 |
| 1,941,726 | 1/1934 | Vawter | 239—553 |
| 1,953,091 | 4/1934 | Westberg et al. | 302—49 |
| 2,244,050 | 6/1941 | Cassiere | 302—49 |
| 2,419,410 | 4/1947 | Maurer | 239—336 |
| 2,890,079 | 6/1959 | Stumpf | 302—49 |

FOREIGN PATENTS

| 27,555 | 4/1921 | Denmark. |
| 323,253 | 9/1957 | Switzerland. |

M. HENSON WOOD, JR., *Primary Examiner.*

EVERETT W. KIRBY, *Examiner.*